Nov. 26, 1963   S. H. VEGORS ET AL   3,111,881
PROJECTION APPARATUS FOR USE IN TESTING
Filed Aug. 22, 1960
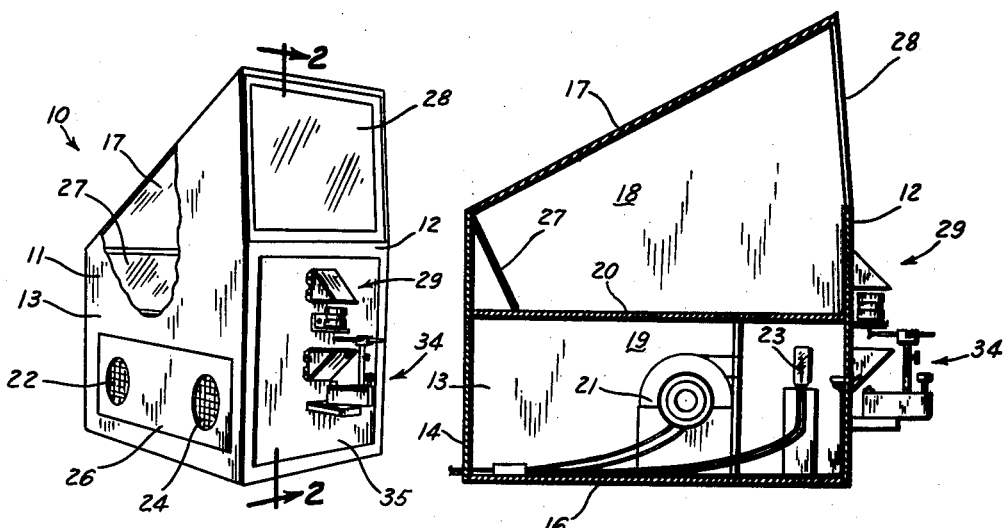
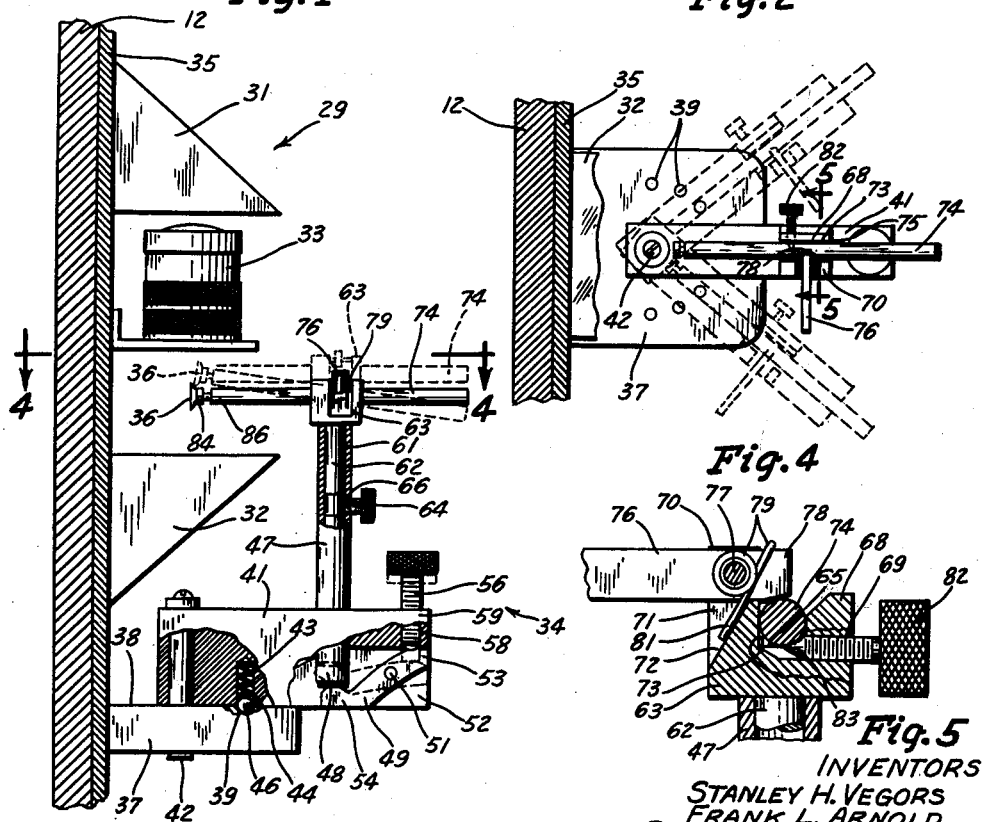
INVENTORS
STANLEY H. VEGORS
FRANK L. ARNOLD
BY
Lowell & Henderson
ATTORNEYS

United States Patent Office 3,111,881
Patented Nov. 26, 1963

3,111,881
PROJECTION APPARATUS FOR USE IN TESTING
Stanley H. Vegors and Frank L. Arnold, Mason City, Iowa, assignors to Vego Incorporated, Mason City, Iowa, a corporation of Iowa
Filed Aug. 22, 1960, Ser. No. 50,991
5 Claims. (Cl. 88—24)

This invention relates to a projection apparatus for enlarging a contact lens, and more partciularly to a positioning device for the projection apparatus which provides quick and readily adjustable positioning of the contact lens for focusing purposes in order to view all surfaces of the lens during high precision edge finishing operations.

It is an object of this invention to provide a novel contact lens positioning device for a projection apparatus.

It is a further object of this invention to provide a positioning device for a projection apparatus whereby all surfaces of a contact lens mounted on the device can be easily viewed without remounting the contact lens.

Another object of this invention is to provide for a projection apparatus a positioning device to which a contact lens can be easily attached, and whereby the lens can be readily rotated simultaneously about horizontal and vertical axes, and tilted about a vertical plane so as to provide precision inspection of all the surfaces, curves and edges of the lens.

These objects and other features and advantages of this invention will become readily apparent upon reference to the following description and the accompanying drawings, wherein:

FIG. 1 is a perspective view of a projection apparatus embodying the positioning device of this invention, with certain parts broken away for purposes of clarity;

FIG. 2 is a sectional view taken along the line 2—2 of FIG. 1;

FIG. 3 is an enlarged fragmentary side elevational view of a detail of FIG. 2, some parts broken away and others shown in section for clarity of illustration, and showing other parts in alternate positions;

FIG. 4 is an enlarged fragmentary sectional view taken along the line 4—4 in FIG. 3, with certain parts broken away and showing others in alternate positions; and FIG. 5 is an enlarged fragmentary sectional view taken along the line 5—5 in FIG. 4.

Referring now to the drawings, a projection apparatus is indicated generally at 10 in FIG. 1 and includes a housing 11 having a front wall 12, side walls 13, a rear wall 14, a bottom wall 16, and a top wall 17 inclined upwardly from the rear thereof. The housing 11 is divided into an upper chamber 18 and a lower chamber 19 by a horizontal partition 20 (FIG. 2).

In the lower chamber 19, a conventional blower motor 21 is provided for drawing air through an air intake grill 22 and directing it toward an electric lamp 23. The air is diffused outwardly of the lower chamber 19 through an air outlet grill 24, both grills 22 and 24 being mounted in a panel 26 attached to one side 13 of the housing 11. In the upper chamber 18, a mirror 27 is mounted in an inclined manner at the rear thereof for projecting an image against a ground glass screen 28 (FIGS. 1 and 2) mounted at the top of the house front wall 12.

At the lower part of the front wall 12, an optical system indicated generally at 29 is provided which includes upper and lower prism units 31 and 32, respectively, between which an adjustable lens system 33 is secured, the optical system 29 being mounted on a face plate 35 secured to the front wall 12.

In addition to the optical system 29, a focusing or positioning assembly 34 is attached to the face plate 35 for locating a contact lens 36 (FIG. 3) relative to the optical system 29. The positioning assembly 34 includes a base plate 37 secured to the face plate 35 and extended outwardly therefrom, and on the flat top surface 38 of which is formed a plurality of arcuately spaced indentations 39, best illustrated in FIG. 4. An elongated, rectangularly shaped radius arm 41 is pivotally mounted at one end to the base plate 37 by a pivot pin 42 (FIG. 3), and has formed therein a bore 43 in which is assembled a spring 44 and a ball 46. It may readily be seen that the ball and spring unit provides means for frictionally locking the radius arm 41 in various arcuate positions on the base plate 37 as determined by the indentations 39, each indentation adapted to partially receive the ball 46.

A main focus rod 47 is reciprocally mounted in an upstanding position in the radius arm 41, the lower end 48 of the rod 47 being in an engagement with an irregularly formed elevator arm 49. The arm 49 is pivotally mounted by a pin 51 for vertical movement within a slot 52 formed in one end of the radius arm 41. The outer end 53 (FIG. 3) of the arm 49, opposite the inner end 54 of the arm 49 which is in engagement with the main focus rod, is engaged by the lower end of an elevating screw 56 threadably inserted for vertical movement in a threaded bore 58 formed in the free end 59 of the radius arm 41. Thus, by threading the elevating screw 56 up or down, the motion is transmitted through the elevator arm 49 to lower or raise, respectively, the main focus rod 47.

The main focus rod 47 is provided with a bore 61 at its upper end thereof for receiving the depending stem portion 62 of a lens rod chuck 63. The chuck 63 is rotatable within the bore 61, and can be locked against rotation by a locking screw 64 inserted through a threaded hole 66 formed in the rod 47. The lens rod chuck 63 (FIG. 5) is U-shaped in transverse cross section, one side 68 (FIG. 4) of which has a threaded hole 69 formed therein, and the other side 70 of which has a cut out 71 formed therein with an inclined surface 72 (FIG. 5).

A longitudinally extended slot 73, formed between the sides 68 and 70 and above a bottom wall 65 (FIG. 5) of the chuck 63, is adapted to receive an elongated rod 74 therein. The rod 74 is loosely held in the slot 73 by a holding pawl 76 (FIG. 4) pivotally mounted by a pin 77 (FIG. 5) to the chuck 63 for a rocking movement in a vertical plane about one end 75 (FIG. 4) of the bottom wall 65. The front end 78 of the holding pawl 76 is held down against the rod 74 by a U-shaped spring 79 mounted about the pin 77 and the legs 81 of which engage the inclined surface 72.

An aligning screw 82 (FIG. 5) is inserted through the bore 69 in the side 68 of the chuck 63, so that the tapered end 83 is beneath the rod 74 at a location spaced from the bottom wall end 75 and with the holding pawl 76 intermediate thereof. It is thus apparent that by threading the aligning screw 82 inwardly of the chuck 63, the rod 74 will be tilted from the full line position of FIG. 3 to the dotted line position thereof. One end of the rod 74 is adapted to receive a contact lens chuck 84 (FIG. 3), the outer end of which has a concave surface (not shown) curved so as to receive the convex surface of a contact lens 36 in the manner best illustrated in FIG. 3.

To use the apparatus 10, after starting the blower motor 21 and turning on the lamp 23 by an on-off switch (not shown), a piece of double-sided adhesive (not shown) is affixed to the face of the lens chuck 84 and the convex curve side of the contact lens 36 is pressed onto the face against the adhesive. The contact lens 36 is thus mounted on the lens chuck 84 as illustrated in FIG. 3, and where the lens chuck 84 is shown inserted into the end 86 of the rod 74. With the locking screw 64 loosened, the rod 74 and rod chuck 63 are swiveled so that the contact lens 36 is under the lens 33 after which the locking screw 64 is tightened.

To bring both sides of the contact lens edge into parallel alignment on the screen 28, the elevating screw 56 and the aligning screw 82 are manipulated until the sharpest presentation on the screen 28 is obtained. To observe the entire lens edge, the rod 74 is rotated slowly in either direction about its longitudinal axis as it lies nested in the slot 73. The entire contact lens 36 can be viewed on the screen 28 by pivoting the radius arm 41 about its pin 42 in the various stop positions determined by the indentations 39.

In summary, the positioning assembly 34 provides for focusing movement of a contact lens in a straight up and down direction, and in a straight horizontal back and forth direction by reciprocal movement of the rod 74 in its slot 73. It also provides for rotation of the contact lens about a horizontal axis by rotation of the rod 74 in place, by rotation about a vertical axis by pivotal movement of the radius arm, and for a tilting movement relative to a vertical plane by adjustment of the aligning screw 82.

Although a preferred embodiment has been described herein, it is to be remembered that various modifications and alternate constructions can be made within the full scope of the invention as defined in the appended claims.

We claim:

1. In a projection apparatus having an optical system, means for positioning a contact lens relative to the optical system for focusing purposes comprising, stationary base means, means pivotally mounted on said base means, upstanding means reciprocally mounted on said pivotally mounted means, a threaded member threadably inserted in said pivotally mounted means, a rocker arm pivotally mounted in said pivotally mounted means and engageable at opposed ends thereof by said upstanding means and said threaded member, chuck means rotatably mounted on said upstanding means and having a bottom wall and a pair of side walls between which a slot is formed, said slot being open at the top one of said side walls having a threaded hole therein extended normal to said slot and axially spaced from one end of said bottom wall, an elongated rod placeable in said slot, one end of which is adapted to hold the contact lens, spring means connected to said chuck means and engageable with said rod intermediate said threaded hole and said one end for resiliently holding said rod within said slot, and a member threadably inserted through said threaded hole and engageable with said rod for tilting said rod in a vertical plane about said one end.

2. In a projection apparatus having an optical system, means for positioning a contact lens relative to the optical system for focusing purposes comprising, stationary base means, means pivotally mounted on said base means and including spring biased means operatively engageable with said base means for releasably locking said pivotally mounted means on said base means in any one of a plurality of arcuately spaced positions, upstanding means reciprocally mounted on said pivotally mounted means, a threaded member threadably inserted into said pivotally mounted means and operatively engageable with said upstanding means whereby threaded movement of said threaded member results in movement of said upstanding means, chuck means rotatably mounted on said upstanding means and having a bottom wall and a pair of side walls between which a slot is formed, said slot being open at the top, one of said side walls having a threaded hole therein extended normal to said slot and axially spaced from one end of said bottom wall, an elongated rod placeable in said slot, one end of which is adapted to hold the contact lens, spring means connected to said chuck means and engageable with said rod at a location thereon intermediate said threaded hole and said one end for resiliently holding said rod within said slot, and a member threadably inserted through said threaded hole and engageable with said rod for tilting said rod in a vertical plane about said one end.

3. In a projection apparatus having an optical system, means for positioning a contact lens relative to the optical system for focusing purposes comprising, stationary base means having a substantially flat surface with a plurality of arcuately spaced indentations formed therein, a radius arm pivotally mounted at one end to said base means and having a spring-pressed ball mounted therein radially from said pivot mounting, said ball compressibly engageable in any one of said indentations, upstanding means reciprocally mounted on said pivotally mounted means, a threaded member threadably inserted into said pivotally mounted means and operatively engageable with said upstanding means whereby threaded movement of said threaded member results in movement of said upstanding means, chuck means rotatably mounted on said upstanding means and having a bottom wall and a pair of side walls between which a slot is formed, one of said side walls having a threaded hole therein extended normal to said slot and axially spaced from one end of said bottom wall, an elongated rod placeable in said slot, one end of which is adapted to hold the contact lens, spring means connected to said chuck means and engageable with said rod intermediate said threaded hole and said one end for resiliently holding said rod within said slot, and a member threadably inserted through said threaded hole and engageable with said rod for tilting said rod in a vertical plane about said one end.

4. In a projection apparatus having an optical system, means for positioning a contact lens relative to the optical system for focusing purposes comprising, stationary base means, means pivotally mounted on said base means, upstanding means mounted on said pivotally mounted means, chuck means rotatably mounted on said upstanding means and having a bottom wall and a pair of side walls between which a slot is formed, said slot being open at the top, one of said side walls having a hole therein extended normal to said slot and axially spaced from one end of said bottom wall, an elongated rod placeable in said slot, one end of which is adapted to hold a contact lens, means connected to said chuck means and engageable with said rod intermediate said hole and said one end for resiliently holding said rod within said slot, and a member inserted through said hole engageable with said rod for tilting said rod in a vertical plane about said one end.

5. The apparatus defined in claim 4 including detent means operatively associated with said stationary base means and said pivotally mounted means for releasably locking said pivotally mounted means on said base means in any one of a plurality of arcuately spaced positions.

References Cited in the file of this patent

UNITED STATES PATENTS

| | | |
|---|---|---|
| 1,750,931 | Kellner et al. | July 7, 1927 |
| 1,777,185 | Thompson | Sept. 30, 1930 |
| 2,387,210 | Wood et al. | Oct. 16, 1945 |
| 2,597,168 | North | May 20, 1952 |
| 2,669,833 | Hill et al. | Feb. 23, 1954 |
| 2,747,463 | Biggs | May 29, 1956 |
| 2,967,458 | Stone | Jan. 10, 1961 |